(12) United States Patent
Draznin et al.

(10) Patent No.: US 8,914,664 B2
(45) Date of Patent: Dec. 16, 2014

(54) RECOVERING INFORMATION BASED ON DEVICE FUNCTIONALITY

(75) Inventors: Sagiv Draznin, Walnut Creek, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 284 days.

(21) Appl. No.: 13/466,240

(22) Filed: May 8, 2012

(65) Prior Publication Data

US 2013/0305082 A1   Nov. 14, 2013

(51) Int. Cl.
*G06F 11/00* (2006.01)

(52) U.S. Cl.
USPC .......................................................... 714/4.1

(58) Field of Classification Search
CPC .. G06F 11/0793; H04L 41/0654; H04L 45/28
See application file for complete search history.

(56) References Cited

U.S. PATENT DOCUMENTS

| 7,518,987 | B2 * | 4/2009 | Biswas et al. | 370/221 |
| 2008/0013447 | A1 * | 1/2008 | Lauber | 370/225 |
| 2008/0232247 | A1 * | 9/2008 | Evans et al. | 370/228 |
| 2011/0149951 | A1 * | 6/2011 | Qiu et al. | 370/352 |
| 2012/0327763 | A1 * | 12/2012 | Bayareddy et al. | 370/217 |
| 2013/0229922 | A1 * | 9/2013 | Li et al. | 370/242 |
| 2013/0272109 | A1 * | 10/2013 | Qiu et al. | 370/216 |

OTHER PUBLICATIONS

"3rd Generation Partnership Project; Technical Specification Group Services and System Aspects; GPRS Enhancements for E-UTRAN Access (Release 8)", Global System for Mobile Communications; 3GPP TS 23.401 V1.0.0, May 2007, pp. 1-50.
"3rd Generation Partnership Project; Technical Specification Group Services and System Aspects; Architecture Enhancements for non-3GPP Accesses (Release 8)", Global System for Mobile Communications; 3GPP TS 23.402 V1.0.0, May 2007, pp. 1-50.

* cited by examiner

*Primary Examiner* — Christopher McCarthy

(57) ABSTRACT

A first memory device receives session information associated with a session between a first network device and a user device. The first memory device outputs the session information associated with the session information. A second memory device receives the session information, associated with the session, from the first memory device. The second memory device receives a communication from the first memory device that the first network device is not functioning. The second memory device sends session information to a second network device, based on receiving the communication from the first network device that the first network device is not functioning, the second network device taking over the session from the first network device.

25 Claims, 9 Drawing Sheets

US 8,914,664 B2

RECOVERING INFORMATION BASED ON DEVICE FUNCTIONALITY

BACKGROUND

Devices may establish a session with a service provider to obtain content. Each time that a device establishes a session with a service provider, information related to the session may be transmitted from the service provider to the device, or vice versa. At times, there could be a failure of service between the device and the service provider. A failure of service may result in a poor experience for a user of the device.

DETAILED DESCRIPTION OF PREFERRED EMBODIMENTS

The following detailed description refers to the accompanying drawings. The same reference numbers in different drawings may identify the same or similar elements.

Systems and/or methods described herein may store session information in a memory, and may retrieve the session information from the memory when a connection is lost from the service provider to a user device. For example, the memory of a communications network may determine that a communication between a service provider's network device and the user device is no longer active. The memory may store session information associated with the communication. The memory may communicate the session information with an alternative network device, so that a connection can be established between the user device and the alternative network device.

As a result, the alternative network device may not require the original network device to communicate the session information to the alternative network device. The memory, which stores the session information, may be located external to the original network device and the alternative network device. Thus, the transfer of session information to the alternative network device may not result in a loss of service, and may not result in any quality of service issues between the user device and the service provider.

Figure 1:
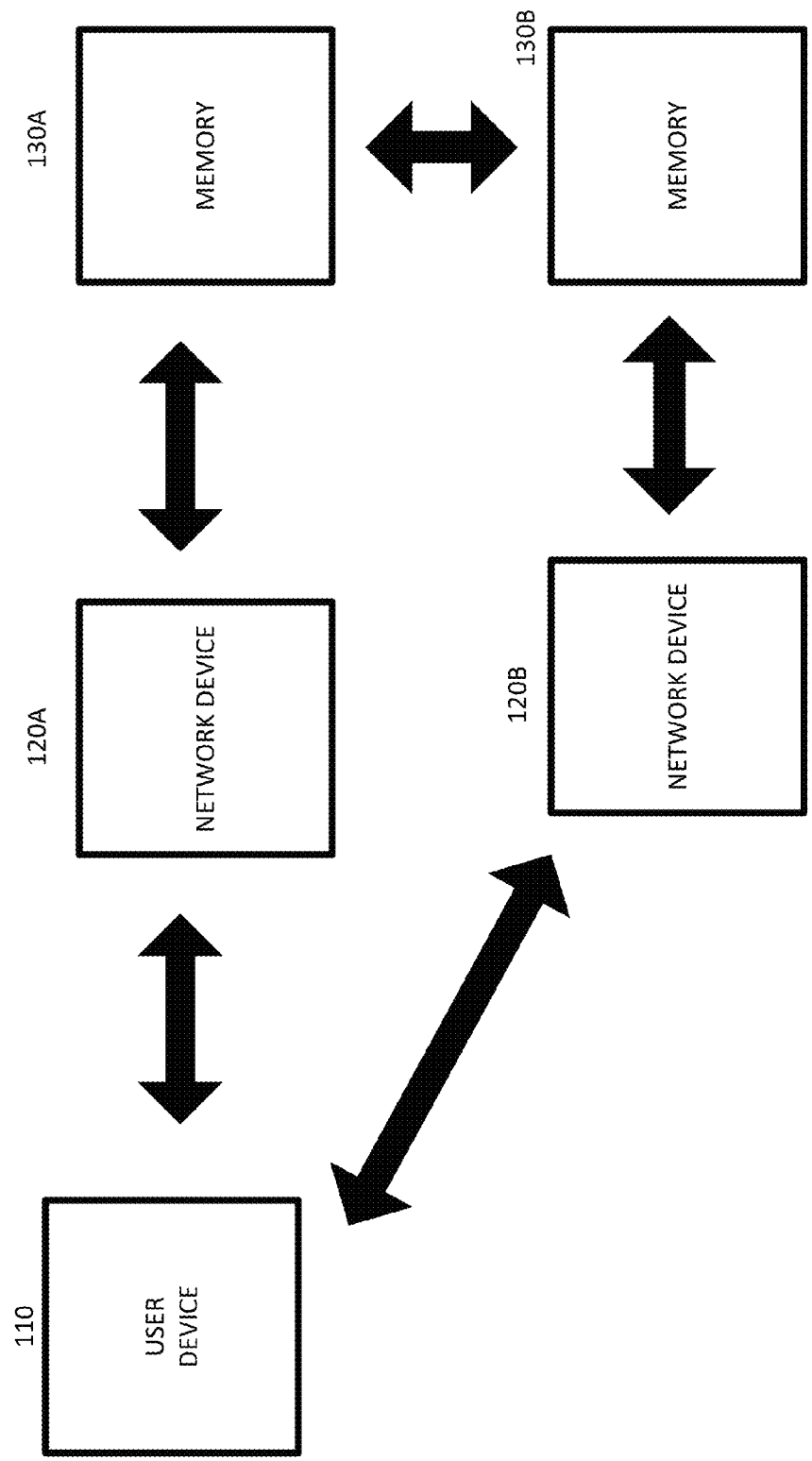
FIG. 1 is a diagram of an overview of an implementation described herein.

FIG. 1 is a diagram of an overview of an implementation described herein. FIG. 1 shows a user device 110, network devices 120A and 120B, and memories 130A and 130B. In practice, there may be additional or fewer user devices, network devices, and/or memories. As shown, in FIG. 1, assume that user device 110 establishes a session with network device 120A. Network device 120A may send information regarding the session to memory 130A. Memory 130A may share the session information with memory 130B. Memory 130A and memory 130B may be a part of the same memory or may be independent of each other.

Assume that at some later time, network device 120A ceases to function. Memory 130A may determine that network device 120A is no longer functioning, and may notify memory 130B. Memory 130B may communicate with network device 120B, and provide the session information, regarding the session that was originally established through network device 120A, to network device 120B. Network device 120B may then communicate with user device 110, which may result in no disruption in the communication with user device 110.

Figure 2:
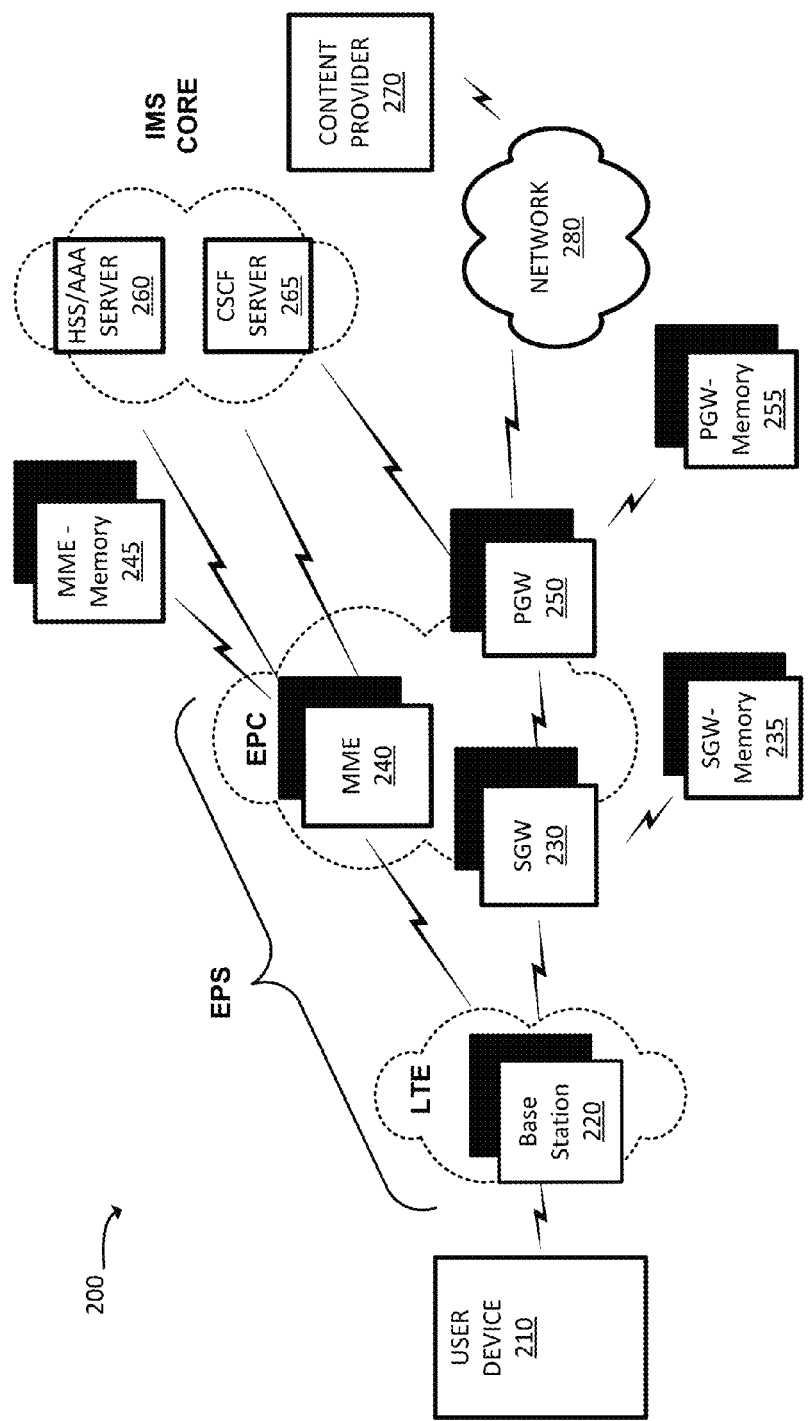
FIG. 2 is a diagram of an example environment in which systems and/or methods described may be implemented.

FIG. 2 is a diagram of an example environment 200 in which systems and/or methods described herein may be implemented. As shown in FIG. 2, environment 200 may include a user device 210, a base station 220, a serving gateway 230 (hereinafter referred to as "SGW 230"), a serving gateway memory 235 (hereinafter referred to as "SGW-memory 235"), a mobility management entity device 240 (hereinafter referred to as "MME 240"), a mobility managed entity memory 245 (hereinafter referred to as "MME-memory 245"), a packet data network (PDN) gateway (PGW) 250, a packet data network (PDN) gateway (PGW) memory 255 (hereinafter referred to as "PGW-memory 255"), a home subscriber server (HSS)/authentication, authorization, accounting (AAA) server 260 (hereinafter referred to as an "HSS/AAA server 260"), a call session control function (CSCF) server 265 (hereinafter referred to as "CSCF server 265"), a content provider 270, and a network 280. The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2.

Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, SGW-memory 235, MME 240, MME-memory 245, PGW 250, and/or PGW-memory 255 that enables user device 210 to communicate with network 280 and/or an Internet protocol (IP) multimedia subsystem (IMS) core. The IMS core may include HSS/AAA server 260 and/or CSCF server 265 and may manage authentication, session initiation, account information, a user profile, etc. associated with user device 210.

As shown in FIG. 2, the LTE network may include multiple base stations 220, and the EPC may include multiple SGWs 230, SGW-memories 235, MMEs 240, MME-memories 245, PGW 250, and/or PGW-memories 255. In one implementation, a SGW-memory 235 may be shared by multiple SGWs 230, a MME-memory 245 may be shared by multiple MMEs 240, and/or a PGW-memory 255 may be shared by multiple PGWs 250.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 210 may send traffic to and/or receive traffic from network 280.

User device 210 may execute applications stored in a memory associated with user device 210. User device 210 may also, or alternatively, communicate, via network 280, with content provider 270 to obtain content (e.g., video content, image content, advertising content, etc.) and/or access a service and/or application (e.g., via a website hosted by content provider 270).

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies. For idle state user device 210, SGW 230 may terminate a downlink (DL) data path and may trigger paging when DL data arrives for user device 210.

SGW-memory 235 may include one or more network devices, or other types of computation or communication devices that gather, process, store and/or provide information described therein. SGW-memory 235 may, for example, create a session to allow SGW 230 to connect to the user device 210 via base station 220. SGW-memory 235 may also store session information associated with a session between user device 210 and SGW 230 via base station 220. The session information may, for example, include various information regarding the session, such as contexts associated with user device 210, such as parameters of an IP bearer service, network internal routing information; information about the active status of user device 210; and/or identification information regarding base station 220 via which user device 210 communicates with SGW 230.

MME 240 may include one or more computation or communication devices that gather, process, search, store, and/or provide information in a manner described herein. For example, MME 240 may perform operations associated with a handoff to and/or from the EPS. MME 240 may perform operations to register user device 210 with the EPS, to hand-off user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

MME-memory 245 may include one or more network devices, or other types of computation or communication devices that gather, process, store and/or provide information described therein. MME-memory 245 may, for example, create a session to allow MME 240 to connect to user device 210 via base station 220. MME-memory 245 may, for example, also store session information associated with a session between user device 210 and MME 240 via base station 220. For example, the session information may include various information regarding the session, such as identification information related to user device 210, such as a temporary identity given to user device 210; and/or authentication information for user device 210 obtained from HSS/AAA server 260.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

PGW-memory 255 may include one or more network devices, or other types of computation or communication devices that gather, process, store and/or provide information described therein. PGW-memory 255 may, for example, create a session to allow PGW 250 to connect to the user device 210 via base station 220. PGW-memory 255 may also store session information associated with a session between user device 210 and PGW 250 via base station 220. The session information may, for example, include various information regarding the session, such as identification information regarding user device 210 and/or identification information regarding SGW 230.

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more server devices, or other types of computation or communication devices, that gather, process, search, store, and/or provide information in a manner described herein. CSCF server 265 may process and/or route calls to and from user device 210 via the EPC. For example, CSCF server 265 may process calls, received from network 280, that are destined for user device 210. In another example, CSCF server 260 may process calls, received from user device 210, that are destined for network 280.

Content provider 270 may include one or more server devices, or other types of computation or communication devices, that provide any type or form of content. For example, content provider 270 may provide free television broadcasts (e.g., local broadcasts, such as NBC, CBS, ABC, and/or Fox), for-pay television broadcasts (e.g., TNT, ESPN, HBO, Cinemax, CNN, etc.), and/or Internet-based content (e.g., Youtube, Vimeo, Netflix, Hulu, Veoh, etc.) streamed from web sites. Content provider 270 may produce media streams (e.g., television broadcasts). A "media stream," as used herein, may refer to stream of content that includes video content (e.g., a video stream), audio content (e.g., an audio stream), textual content (e.g., a textual stream), and/or a combination of the aforementioned content. Additionally, or alternatively, content provider 270 may provide web pages, documents, images, advertising content, etc. Additionally, or alternatively, content provider 270 may provide applications and/or services, such as games, scripts, messaging services, etc.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

While environment 200 has been described in terms of an EPS, this need not be the case. In another implementation, environment 200 may include devices associated with a system that does not include an LTE, an EPC and/or an IMS core.

Figure 3:
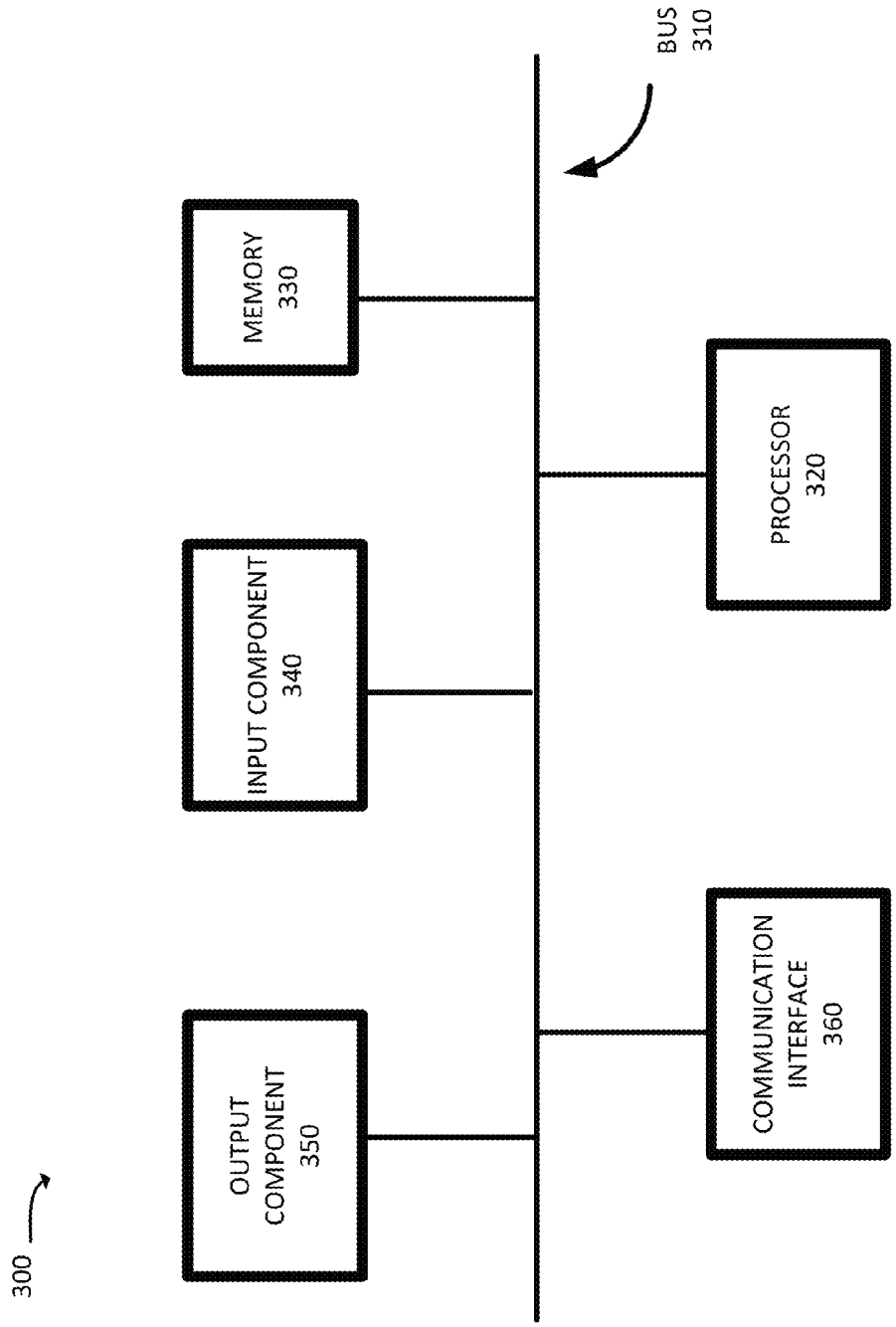
FIG. 3 is a diagram of example components of one or more of the devices of FIG. 2.

FIG. 3 is a diagram of example components of a device 300. Device 300 may correspond to user device 210, SGW 230, SGW-memory 235, MME 240, MME-memory 245, PGW 250, PGW-memory 255, and/or content provider 270. Alternatively, or additionally, each of user device 210, SGW 230, SGW-memory 235, MME 240, MME-memory 245, PGW 250, PGW-memory 255, and/or content provider 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 280.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
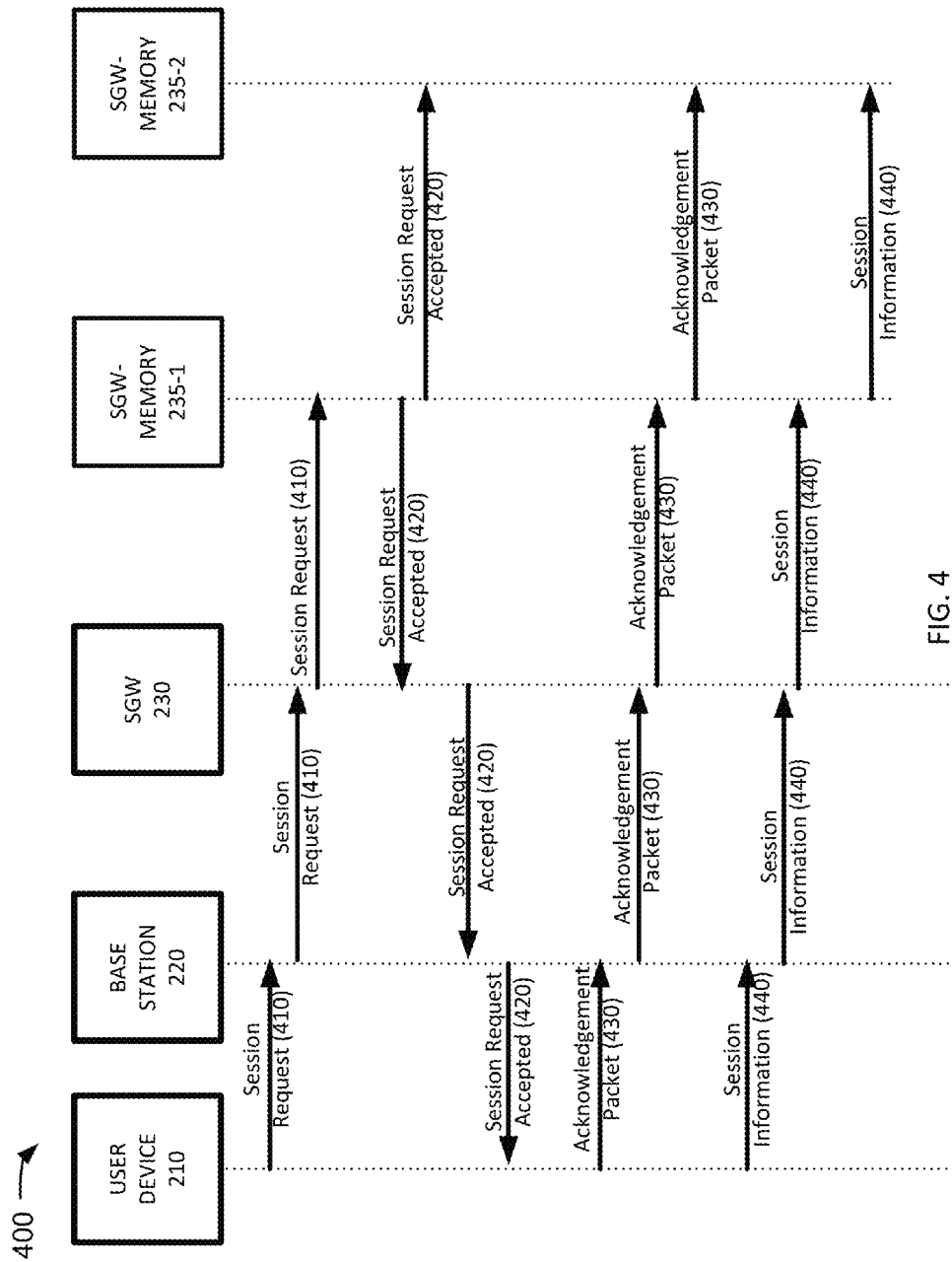
FIG. 4 is a call flow diagram of example operations capable of being performed by an example portion of the environment in FIG. 2.

FIG. 4 is a call flow diagram of example operations capable of being performed by an example portion 400 of environment 200. As shown in FIG. 4, portion 400 may include user device 210, base station 220, SGW 230, SGW-memory 235-1, and SGW-memory 235-2. User device 210, base station 220, SGW 230, SGW-memory 235-1, and SGW-memory 235-2 may include components and/or perform functions described above in connection with, for example, one or more of FIGS. 1-3.

SGW 230 and SGW-memory 235 may be replaced with MME 240 and MME-memory 245, respectively, in the flow diagram of example operations in FIG. 4. SGW 230 and SGW-memory 235 may also, or alternatively, be replaced with PGW 250 and PGW-memory 255, respectively, in the flow diagram of example operations in FIG. 4. MME 240, MME-memory 245, PGW 250, and PGW-memory 255 may include components and/or perform functions described above in connection with, for example, one or more of FIGS. 1-3.

As shown in FIG. 4, user device 210 may communicate with base station 220 to provide a session request 410. For example, user device 210 may be requesting connection to network 280 (FIG. 2) to begin a session allowing user device 210 to obtain a multimedia stream from a content provider 270, described with regard to FIG. 2. Base station 220 may transmit the session request 410 to SGW 230. The session request 410 may include information identifying user device 210 and base station 220. SGW 230 may transmit the session request 410 to SGW-memory 235-1. SGW-memory 235-1 may receive session request 410. SGW-memory 235-1 may create and transmit a session request accepted message 420 to user device 210 via SGW 230 and base station 220. SGW-memory 235-1 may also forward the session request accepted message 420 to SGW-memory 235-2. SGW-memory 235-1 and/or SGW-memory 235-2 may store the session request accepted message 420.

User device 210 may receive the session request accepted message 420 and may transmit acknowledgement packet 430 to base station 220 in response to receiving the session request accepted message 420. Base station 220 may receive acknowledgement packet 430 and forward acknowledgement packet 430 to SGW 230. SGW 230 may forward acknowledgement packet 430 to SGW-memory 235-1. SGW-memory 235-1 may forward acknowledgement packet 430 to SGW-memory 235-2.

User device 210 may transmit session information 440 to base station 220. Base station 220 may receive session information 440 and forward the session information 440 to SGW 230. SGW 230 may forward session information 440 to SGW-memory 235-1. SGW-memory 235-1 may store session information 440. SGW-memory 235-1 may forward the session information to SGW-memory 235-2. SGW-memory 235-2 may store the session information. SGW-memory 235-1 and SGW-memory 235-2 may be independent devices or may be part of the same device. The session information 440 may include information regarding the session, such as information identifying, for example, base station 220 and information regarding the active status of user device 210.

Figure 5:
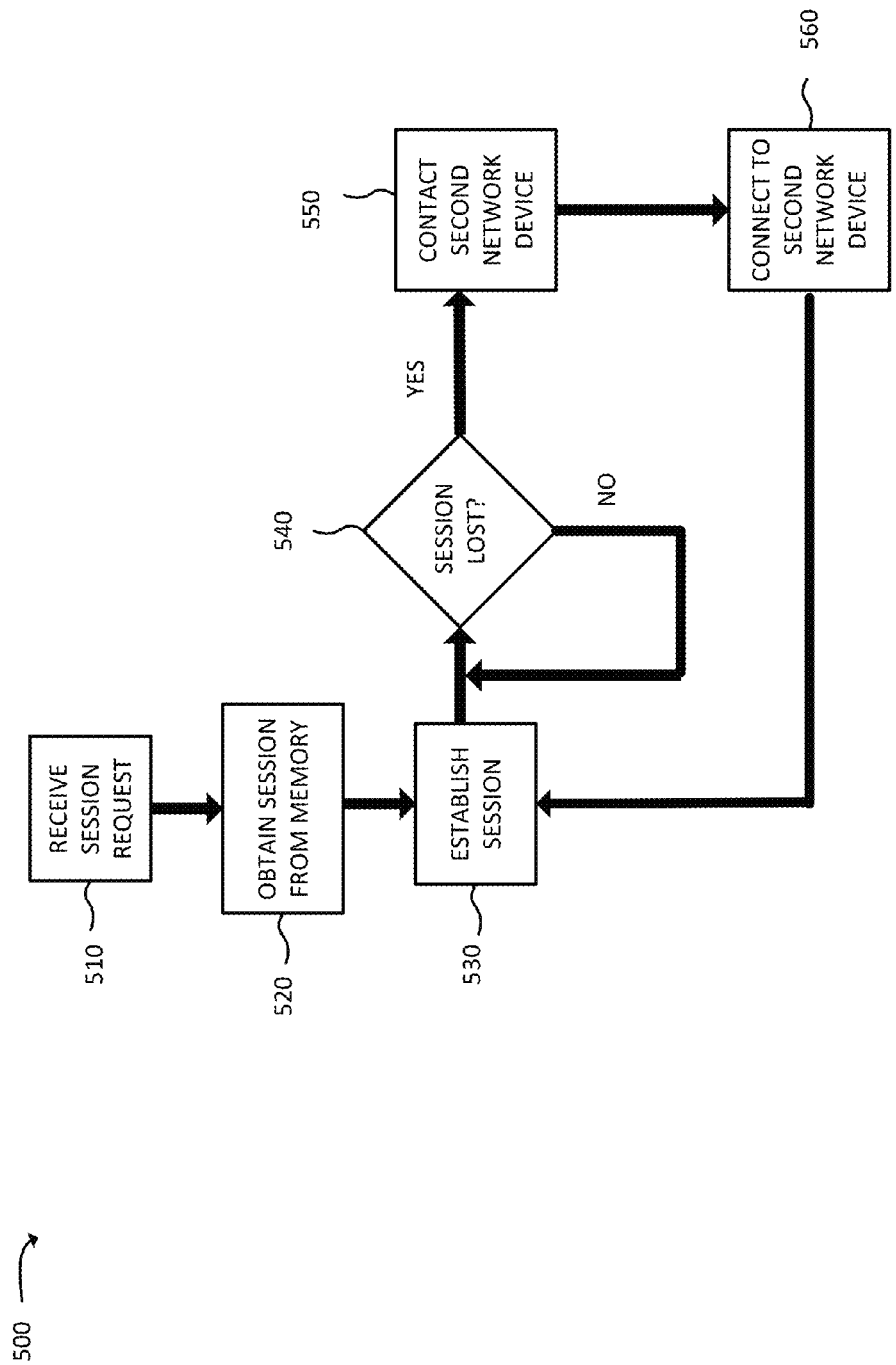
FIG. 5 is flow chart of an example process for establishing and maintaining a session.

FIG. 5 is a flow chart of an example process 500 for establishing and maintaining a session. In one implementation, process 500 may be performed by a network device, such as SGW 230, SGW-memory 235, MME 240, MME-memory 245, PGW 250, and/or PGW-memory 255.

Process 500 may include receiving a session request (block 510). For example, assume that a user, of user device 210, wants to obtain multimedia streaming content. Accordingly, user device 210 may generate a session request and may send the session request to a network device. The network device may receive the session request from user device 210.

In an example implementation, the network device may correspond to SGW 230. User device 210 may communicate with SGW 230. SGW 230 may receive the session request, as session request 410 (described, with regard to FIG. 4), from user device 210.

Process 500 may include obtaining a session from memory (block 520). For example, the network device may forward the session request to an associated memory. The memory may process the session request and create a session by, for example, storing certain information, associated with the session, in the memory. The memory may generate and output a session request accepted message back to the network device.

In an example implementation where the network device corresponds to SGW 230 and the associated memory corresponds to SGW-memory 235, SGW 230 may forward the session request, received from user device 210, to SGW-memory 235 (as shown as session request 410 in FIG. 4). SGW-memory 235 may process the session request and create a session. SGW-memory 235 may generate a session request accepted message (shown as session request message 420 in FIG. 4) and send the session request accepted message to SGW 230.

Process 500 may also include establishing a session (block 530). For example, the network device may contact user device 210 to inform user device 210 that a session has been established. In one implementation, a session may be established when the network device provides user device 210 with a session request accept message. In another implementation, the network device may establish a session in another way.

In an example implementation where the network device corresponds to SGW 230 and the associated memory corresponds to SGW-memory 235, SGW 230 may send a session request accepted message (shown as session request accepted message 420 in FIG. 4) to user device 210. User device 210 may receive the session request accepted message and may send an acknowledgement packet (as shown as acknowledgement packet 440 in FIG. 4) to SGW-memory 235. In one implementation, the session may be established when the session request accepted message is sent to user device 210. In another implementation, the session may be established upon receipt of the acknowledgement packet. In yet another implementation, the session may be established prior to sending the session request accepted message or after receiving the acknowledgement packet.

Process 500 may also include determining that the session is lost (block 540-YES). For example, assume that the network device loses contact with the memory device. In one implementation, the network device itself may fail. In another implementation, the connection between the network device and the memory device, and/or another network device, may fail.

In an example implementation where the network device corresponds to SGW 230 and the associated memory corresponds to SGW-memory 235, the session may be lost when SGW 230 no longer sends a ping, or heartbeat, to SGW-memory 235. This may occur because SGW 230 fails, or the connections to/from SGW 230 fails.

Process 500 may also include determining that the session is not lost (block 540-NO). For example, the network device may continue to function and continue to send information to the memory device without any loss of service. In an example implementation where the network device corresponds to SGW 230 and the memory device corresponds to SGW-memory 235, SGW 230 may continue to send a ping or heartbeat communication to SGW-memory 235.

Process 500 may also include contacting a second network device (block 550). For example, the memory device may contact a second network device and forward session information that was between the network device and user device 210.

In an example implementation, the network device corresponds to SGW 230 (hereinafter SGW 230-1), the memory device corresponds to SGW-memory 235, and the second network device corresponds to a device similar to SGW 230 (hereinafter SGW 230-2). SGW-memory 235 may correspond to one memory device or may correspond to multiple memory devices. SGW-memory 235 may forward the session information, associated with the session between user device 210 and SGW 230-1, to SGW 230-2. The session information may, for example, include contexts associated with user device 210, such as parameters of an IP bearer service, network internal routing information; whether the user device 210 is active; and/or identification information of base station 220 that is connected to SGW 230-1.

Process 500 may also include connecting to the second network device (block 560). For example, the second network device may contact user device 210 and inform user device 210 that the second network device has taken over the functions of the network device that failed.

In the example implementation where the network device corresponds to SGW 230-1 and the second network device corresponds to SGW 230-2, SGW 230-2 (via base station 220) may inform user device 210 that SGW 230-2 has taken over the functions of SGW 230-1. User device 210 may, thereafter, send session information to SGW 230-2 without any interruption. As a result, there may be no disruption in service for user device 210.

FIGS. 6A-6D are diagrams of example processes 600 for establishing and maintaining a session. FIGS. 6A-6D show a user device 610, a base station 620, MME1 630, MME2 635, MME1-memory 640, MME2-memory 645, SGW1 650, SGW2 655, PGW1 660, PGW2 665, PGW1-memory 670, PGW2-memory 675, SGW1-memory 680, and SGW2-memory 685. In practice, there may be additional or fewer user devices, base stations, SGW devices, MME devices, PGW devices, SGW memories, MME memories, and/or PGW memories.

An example of user device 610 may correspond to user device 210, described with regard to FIG. 2. An example of base station 620 may correspond to base station 220, described with regard to FIG. 2. An example of SGW1 650 and SGW2 655 may correspond to SGW 230, described with regard to FIG. 2. An example of SGW1-memory 680 and SGW-memory 685 may correspond to SGW-memory 235, described with regard to FIG. 2. An example of MME1 630 and MME2 635 may correspond to MME 240, described with regard to FIG. 2. An example of MME1-memory 640 and MME2-memory 645 may correspond to MME-memory 245, described with regard to FIG. 2. An example of PGW1 660 and PGW2 665 may correspond to PGW 250, described with regard to FIG. 2. An example of PGW1-memory 670 and PGW2-memory 675 may correspond to PGW-memory 255, described with regard to FIG. 2.

Figure 6A:
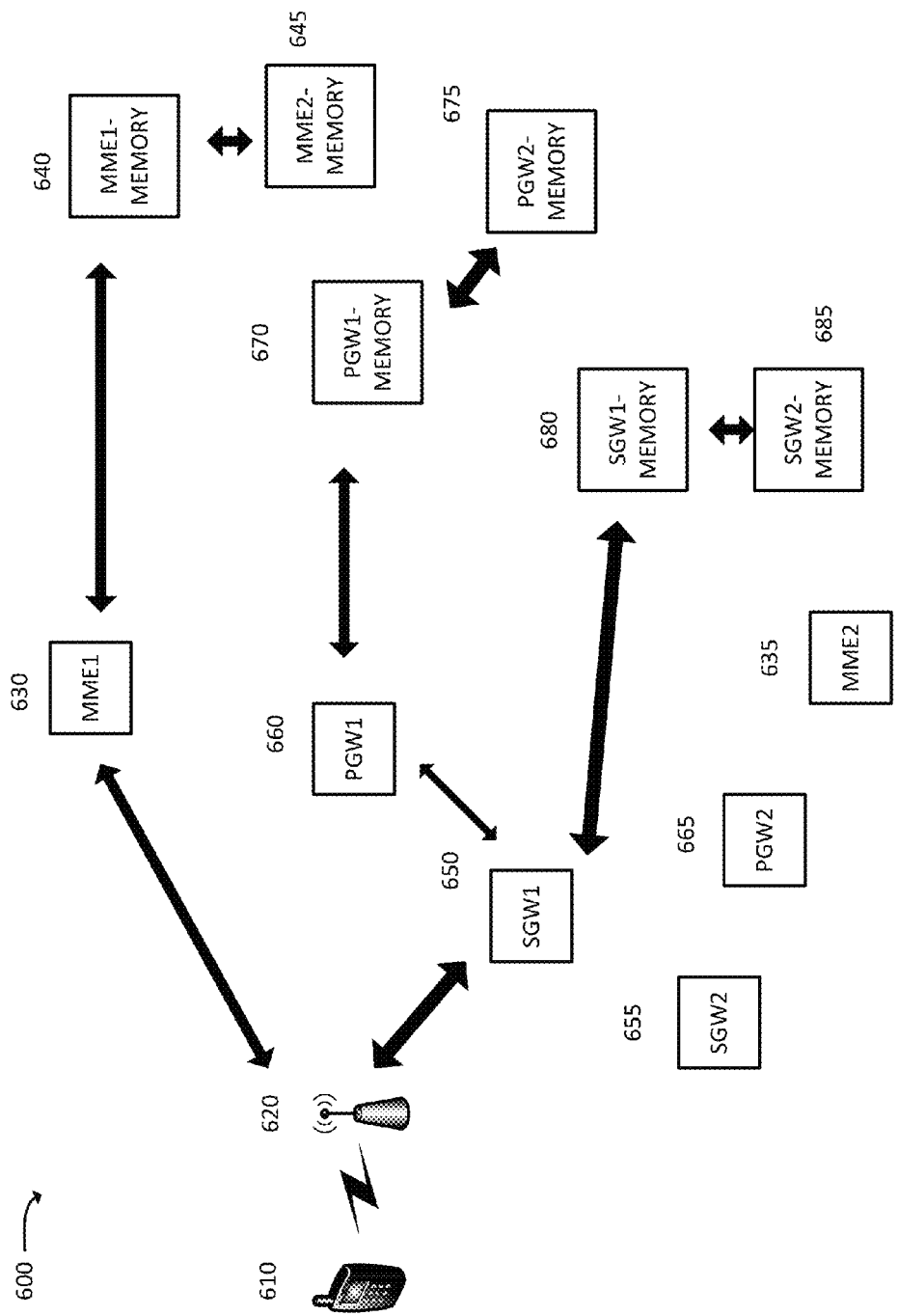
FIGS. 6A-6D are diagrams of example processes for establishing and maintaining a session.

As shown in FIG. 6A, assume that user device 610 has a session with SGW1 650 via base station 620. Assume that the session has already been created according to blocks 510, 520, and 530 as described in FIG. 5. Assume that user device 610 is sending session information, related to the session, to SGW1 650. SGW1 650 may forward the session information, related to the session with user device 610, to SGW1-memory 680. An example of session information may include information identifying user device 610, information identifying a location of user device 610, information identifying base station 620; information about the active status of user device 610; and/or context information associated with user device 610, such as parameters of an IP bearer service and/or network internal routing information.

SGW1-memory 680 may store the session information. SGW1-memory 680 may store information relating to the session request 410, described with regard to FIG. 4. SGW1-memory 680 may forward the session information and/or session request information to SGW2-memory 685. SGW2-memory 685 may store the session information and/or the session request information.

SGW1-memory 680 and SGW2-memory 685 may be separate devices or may be part of the same device. A benefit of SGW1-memory 680 and SGW2-memory 685 being separate devices, is that there is added redundancy and fault tolerance. A benefit of SGW1-memory 680 and SGW2-memory 685 being the same memory device, is that there are fewer memory devices to maintain and lower costs associated with having fewer devices.

As shown in FIG. 6A, user device 610 may also, or alternatively, have a session with MME1 630 via base station 620. User device 610 may send session information, related to the session, to MME1 630 via base station 620. MME1 630 may forward the session information, related to the session with user device 610, to MME1-memory 640. For example, the session information sent by MME1 630 to MME1-memory 640 may include information identifying user device 610, information identifying temporary identities given to user device 610, and/or information identifying authentication of user device 610. MME1-memory 640 may store this session information and may store session request information related to session request 410 as shown in FIG. 4. MME1-memory 640 may forward this session information and/or session request information to MME2-memory 645. MME2-memory 645 may store this session information and/or the session request information.

MME1-memory 640 and MME2-memory 645 may be separate devices and/or may be the same device. A benefit of MME1-memory 640 and MME2-memory 645 being separate devices, is that there is added redundancy and fault tolerance. A benefit of MME1-memory 640 and MME2-memory 645 being the same memory device, is that there are fewer memory devices to maintain and lower costs associated with having fewer devices.

As shown in FIG. 6A, user device 610 may also, or alternatively, have a session with PGW1 660 via base station 620 and SGW1 650. User device 610 may send session information, related to the session, to PGW1 660 via base station 620 and SGW1 650. PGW1 660 may forward the session information related to the session with user device 610 to PGW1-memory 670. For example, this session information may include information identifying user device 610, and/or information identifying SGW1 650. PGW1-memory 670 may store this session information, and may store session request information related to session request 410, described with regard to FIG. 4. PGW1-memory 670 may forward this session information, and/or session request information to PGW2-memory 675. PGW2-memory 675 may store this session information and/or the session request information.

PGW1-memory 670 and PGW2-memory 675 may be separate devices and/or may be the same device. A benefit of PGW1-memory 670 and PGW2-memory 675 being separate devices, is that there is added redundancy and fault tolerance. A benefit of PGW1-memory 670 and PGW2-memory 675 being the same device, is that there are less devices to maintain and lower costs associated with having fewer devices.

Figure 6B:
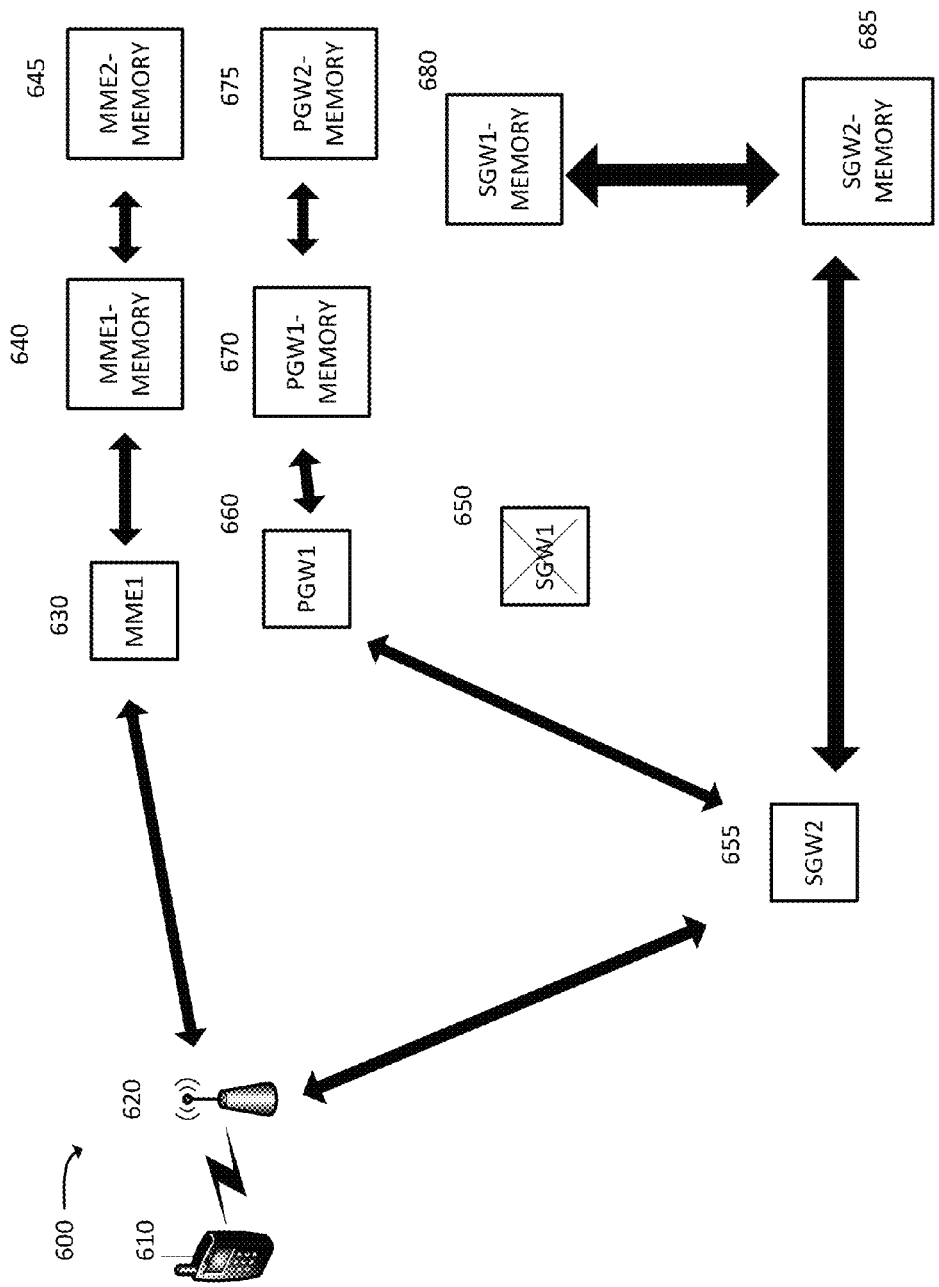

Turning now to FIG. 6B, assume that SGW1 650 ceases to function, which results in the session between user device 610 and SGW1 650 being lost. SGW1-memory 680 may determine that SGW1 650 has ceased to function. For example, when SGW1 650 no longer sends pings or heartbeats to SGW1-memory 680, SGW1-memory 680 may determine that SGW1 650 is not functioning. SGW1 650 may no longer be sending pings or heartbeat because the device itself has failed, or a connection from SGW 650 to another device (such as SGW1-memory 680 or PGW1 660) has failed. SGW1-memory 680 may communicate to SGW-2 memory 685 that SGW1 650 is not functioning. SGW2-memory 685 may communicate with SGW2 655. SGW2 655, may receive from SGW2-memory 685, the session information related to the session that was originally between SGW1 650 and user device 610. This may allow SGW2 655 to communicate with user device 610, and inform user device 610 that SGW2 655 has taken over the session.

SGW2 655 may communicate with base station 620 and provides the session information related to the session between SGW1 650 and user device 610. Base station 620 may contact user device 610, informing user device 610 that the session may now be served by SGW2 655. User device 610 may then continue the session, and send session information to SGW2 655 (instead of SGW1 650) via base station 620. The session information between SGW2 655 and user device 610 may be stored in SGW2-memory 685.

The session information between SGW2 655 and user device 610 may be forwarded from SGW2-memory 685 to another memory device, such as SGW1-memory 680. SGW1-memory 680 may store this session information, and the information related to the session request 410, described with regard to FIG. 4.

Several additional operations may occur when SGW1 650 ceases to function. PGW1 660 may communicate with SGW2 655 instead of SGW1 650. SGW1 650 may communicate information to SGW2 655 by using memory devices, such as SGW1-memory 680 and/or SGW2-memory 685. SGW1-memory 680 and SGW2-memory 685 may function in an active/active mode (both SGW1-memory 680 and SGW2-memory 685 are concurrently active). At a later time, SGW2 655 may cease to function and that process 600 (as describe above) may find another SGW 230 to take over the role of SGW2 655.

In one implementation, the time lapse between changing from SGW1 650 to SGW2 655 may occur in less than one second. Additionally, or alternatively, the time lapse between changing from SGW1 650 to SGW2 655 may result in no disruption in service for user device 610. For example, if user device 610 is receiving streaming multimedia (from content provider 270 in FIG. 2), when a network device (such as SGW 650) fails, changing from one network device (such as from SGW 650 to SGW2 655) may result in no disruption of the streaming multimedia to user device 610.

Figure 6C:
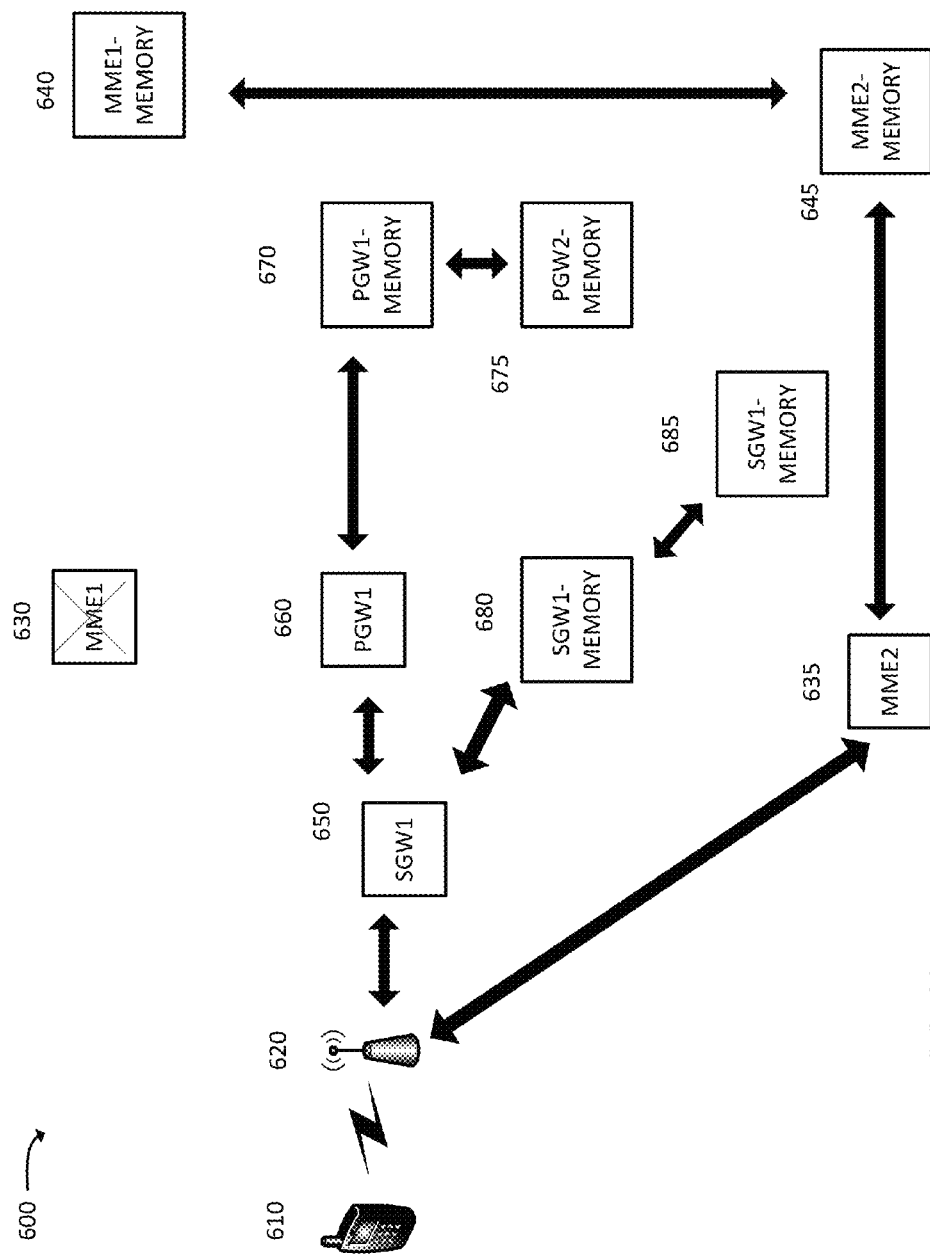

Turning now to FIG. 6C, assume that MME1 630 ceases to function. MME1-memory 640 may determine that MME1 630 has ceased to function. For example, when MME1 630 no longer sends pings or heartbeats to MME1-memory 640, MME1-memory 640 may determine that MME1 630 is not functioning. MME1 630 may no longer be sending pings or heartbeat because MME1 630 has failed, or a connection from MME1 630 to another device (such as MME1-memory 640) has failed. When MME1 630 ceases to function, MME1-memory 640 may communicate to MME2-memory 645 that MME1 630 has ceased to function. MME2-memory 645 may forward the session information, between user device 610 and MME1 630, to MME2 635. This may allow MME2 635 to communicate with user device 610, and inform user device 610 that MME2 635 has taken over the session. MME2 635 may communicate with user device 610 (via base station 620) that MME2 635 has now taken over the functions of MME1 630. User device 610 may continue the session with MME2 635 (instead of MME1 630) via base station 620. The session information between MME2 635 and user device 610 may be stored in MME2-memory 645.

The session information between MME2 635 and user device 610 may be forwarded from MME2-memory 645 to another memory, such as MME1-memory 640. MME1-memory 640 may store this session information, and the information related to the session request 410, described with regard to FIG. 4.

Several additional operations may occur when MME1 630 ceases to function. MME1 630 may communicate information to MME2 635 by using memory devices, such as MME1-memory 640 and/or MME2-memory 645. MME1-memory 640 and MME2-memory 645 may function in an active/active mode (both MME1-memory 640 and MME2-memory 645 are concurrently active). At a later time, MME2 635 may cease to function and that process 600 (as describe above) may find another MME 240 to take over the role of MME2 635.

In one implementation, the time lapse between changing from MME1 630 to MME2 635 may occur in less than one second. Additionally, or alternatively, the time lapse between changing from MME1 630 to MME2 635 may result in no disruption in service for user device 610. For example, if user device 610 is receiving streaming multimedia (from content provider 270 in FIG. 2), when a network device (such as MME1 630) fails, changing from one network device (such as from MME1 630 to MME2 635) may result in no disruption of the streaming multimedia to user device 610.

Figure 6D:
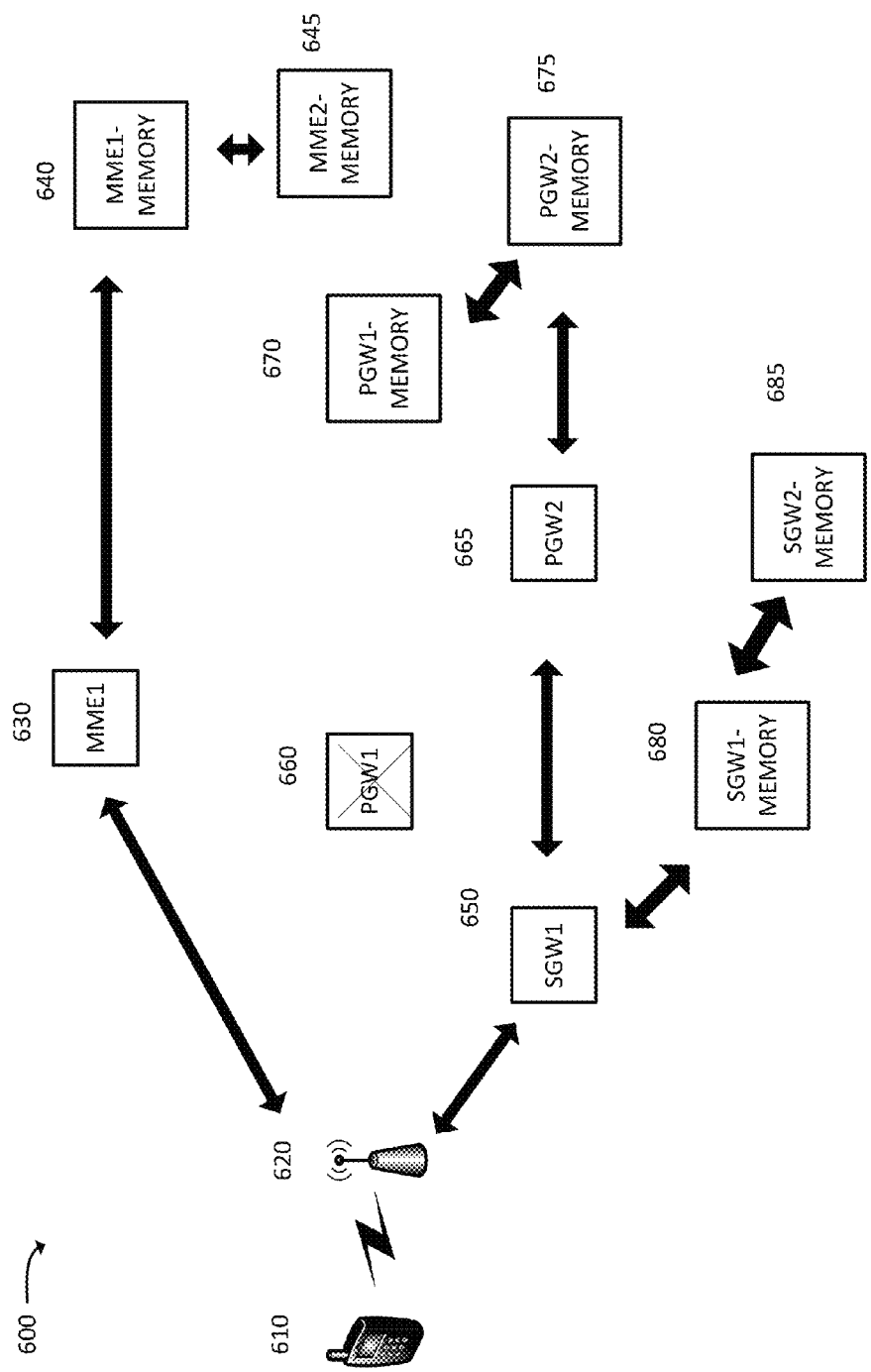

Turning now to FIG. 6D, Assume that PGW1 660 ceases to function. As a result, PGW1-memory 670 may determine that PGW1 660 has ceased to function. For example, when PGW1 660 no longer sends pings or heartbeats to PGW1-memory 670, PGW1-memory 670 may determine that PGW1 660 is not functioning. PGW1 660 may no longer be sending pings or heartbeat because PGW1 660 has failed, or a connection from PGW1 660 to another device (such as SGW1 650 or PGW1-memory 670) has failed. When PGW1 660 ceases to function, PGW1-memory 670 may communicate to PGW2-memory 675 that PGW1 660 has ceased to function. PGW2-memory 675 may forward the session information, between user device 610 and PGW1 660, to PGW2 665. This may allow PGW2 665 to communicate with user device 610, and inform user device 610 that PGW2 655 has taken over the session.

PGW2 665 may communicate with user device 610 (via base station 620 and SGW1 650) that PGW2 665 has taken over the functions of PGW1 660. User device 610 may continue the session with PGW2 655 (instead of PGW1 660) via base station 620. The session information between PGW2 655 and user device 610 may be stored in PGW2-memory 675.

The session information between PGW2 665 and user device 610 may be forwarded from PGW2-memory 675 to another memory device, such as PGW1-memory 670. PGW1-memory 670 may store this session information, and the information related to the session request 410, described with regard to FIG. 4.

Several additional operations may occur when PGW1 660 ceases to function. SGW1 650 may communicate with PGW2 655, instead of PGW1 660. PGW1 660 may communicate information to PGW2 665 by using memory devices, such as PGW1-memory 670 and/or PGW2-memory 675. PGW1-memory 670 and PGW2-memory 675 may function in an active/active mode (both PGW1-memory 670 and PGW2-memory 675 are concurrently active). At a later time, PGW2 665 may cease to function and that process 600 (as described above) may find another PGW 250 to take over the role of PGW2 665.

In one implementation, the time lapse between changing from PGW1 660 to PGW2 665 may occur in less than one second. Additionally, or alternatively, the time lapse between changing from PGW1 660 to PGW2 665 may result in no disruption in service for user device 610. For example, if user device 610 is receiving streaming multimedia (from content provider 270 in FIG. 2), when a network device (such as PGW 660) fails, changing from one network device (such as from PGW 660 to PGW2 665) may result in no disruption of the streaming multimedia to user device 610.

Process 600 shown in FIGS. 6B-6D may have one, some, or all of the network devices, such as MME1 630, MME2 635, MME1-memory 640, MME2-memory 645, SGW1 650, SGW2 655, PGW1 660, PGW2 665, PGW1-memory 670, PGW2-memory 675, SGW1-memory 680, and/or SGW2-memory 685, or similar devices, failing at any time including at the same time. If one, some, or all of MME1 630, MME2 635, MME1-memory 640, MME2-memory 645, SGW1 650, SGW2 655, PGW1 660, PGW2 665, PGW1-memory 670, PGW2-memory 675, SGW1-memory 680, and/or SGW2-memory 685 or similar devices fail, then each device may have its function taken over by one, some, or all of similar network devices. Also, there may be multiple user devices 610 and/or base stations 620.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    establishing, by one or more devices, a session between a first network device and a user device;
    receiving, by the one or more devices and from the first network device, session information associated with the session;
    determining, by the one or more devices, that the first network device is not functioning; and
    forwarding, by the one or more devices and based on determining that the first network device is not functioning, the session information, associated with the session, to a second network device,
    the forwarding including:
        forwarding the session information to a memory device,
            the session information being forwarded from the memory device to the second network device;
        the user device being informed that the second network device has taken over the session from the first network device.

2. The method of claim 1, further comprising:
    forwarding the session information to a third network device when the second network device fails.

3. The method of claim 1, further comprising:
    switching, within one second of the first network device no longer functioning, the session from the first network device to the second network device.

4. The method of claim 1, further comprising:
    switching, when the first network device is no longer functioning, from the first network device to the second network device in a manner that results in no interruption of service for the user device.

5. The method of claim 1, where the second network device takes over the session from the first network device without any interruption in service for the user device.

6. A system comprising:
    a first network device to:
        output session information associated with a session between the first network device and a user device;
    a first memory device to:
        receive the session information associated with the session between the first network device and the user device, and
        output the session information associated with the session; and
    a second memory device to:
        receive the session information, associated with the session, from the first memory device,
        receive a communication from the first memory device that the first network device is not functioning, after receiving the session information from the first memory device, and
        send the session information to a second network device, after receiving the communication from the first memory device that the first network device is not functioning,
            the second network device taking over the session from the first network device.

7. The system of claim 6, where the second network device is further to:
    inform, based on the second memory device sending the session information to the second network device, the user device that the second network device has taken over the session from the first network device.

8. The system of claim 6, where the second network device is further to:
    take over the session, with the user device, from the first network device without any interruption in service for the user device.

9. The system of claim 6, where the first memory device and the second memory device are a same memory device.

10. The system of claim 6, where the first memory device and the second memory device are separate memory devices.

11. The system of claim 6, where the first network device and second network device include at least one of:

one or more serving gateways,
one or more packet data network gateways, or
one or more mobility managed entity devices.

12. The system of claim 6, where the second memory device is further to:
forward, to a third network device when the second network device stops functioning, additional session information related to the session between the second network device and the user device.

13. A system comprising:
a first memory device to:
receive session information associated with a session between a first network device and a user device, and
output the session information associated with the session; and
a second memory device to:
receive the session information, associated with the session, from the first memory device,
receive a communication from the first memory device that the first network device is not functioning,
send session information to a second network device, based on receiving the communication from the first memory device that the first network device is not functioning,
the second network device taking over the session from the first network device, and
forward additional session information, related to a session between the second network device and the user device, to a third network device when the second network device stops functioning.

14. The system of claim 13, where the second network device is further to:
contact the user device that the second network device has taken over the session from the first network device.

15. The system of claim 13, where the second network device is further to:
take over the session with the user device without any interruption in service for the user device.

16. The system of claim 13, where the first memory device and the second memory device are a same memory device.

17. The system of claim 13, where the first memory device and the second memory device are separate memory devices.

18. The system of claim 13, where the second network device is further to:
take over the session, with the user device, from the first network device within one second of the first network device not functioning.

19. A method comprising:
receiving, by a device, session information associated with a session between a first network device and a user device;
determining, by the device, that the first network device is not functioning;
sending, by the device and based on determining that the first network device is not functioning, the session information to a second network device,
the second network device taking over the session from the first network device; and
forwarding, by the device, the session information to a third network device when the second network device fails.

20. The method of claim 19, further comprising:
forwarding, by the device, the session information to a second device,
the first device and second device being separate devices.

21. The method of claim 19, where sending the session information to the second network device includes:
forwarding the session information to a second device,
the session information being forwarded from the second device to the second network device.

22. The method of claim 19, further comprising:
switching, when the first network device is no longer functioning, from the first network device to the second network device in a manner that results in no interruption of service for the user device.

23. The method of claim 19, further comprising:
informing the user device that the second network device has taken over the session from the first network device.

24. The method of claim 19, further comprising:
switching, when the first network device no longer functioning, the session from the first network device to the second network device.

25. The method of claim 19, where the second network device takes over the session from the first network device without any interruption in service for the user device.

* * * * *